US009231353B2

(12) United States Patent
Lee

(10) Patent No.: US 9,231,353 B2
(45) Date of Patent: Jan. 5, 2016

(54) SOCKET HAVING LOADING DETECTING FUNCTION

(75) Inventor: Whe-Ching Lee, New Taipei (TW)

(73) Assignee: POWERTECH INDUSTRIAL CO., LTD., New Taipei (TW)

( * ) Notice: Subject to any disclaimer, the term of this patent is extended or adjusted under 35 U.S.C. 154(b) by 700 days.

(21) Appl. No.: 13/448,606

(22) Filed: Apr. 17, 2012

(65) Prior Publication Data

US 2013/0140895 A1 Jun. 6, 2013

(30) Foreign Application Priority Data

Dec. 2, 2011 (TW) ............................ 100144317 A

(51) Int. Cl.

*H02J 3/00* (2006.01)
*H01R 13/66* (2006.01)
*H01R 25/00* (2006.01)

(52) U.S. Cl.

CPC ........ *H01R 13/6683* (2013.01); *H01R 13/6691* (2013.01); *H01R 25/003* (2013.01); *Y10T 307/469* (2015.04)

(58) Field of Classification Search

CPC ........... H01R 13/6683; H01R 13/6691; H01R 25/003; Y10T 307/469
USPC ................... 307/117, 126, 125; 709/208, 292
See application file for complete search history.

(56) References Cited

U.S. PATENT DOCUMENTS 8,149,570 B2 * 4/2012 Keebler ................ H02J 7/0055 307/11
8,797,174 B2 * 8/2014 Chen .................... H01R 13/665 340/573.1
2003/0065472 A1 * 4/2003 Eckel ..................... H05B 37/02 702/130
2005/0043907 A1 * 2/2005 Eckel ..................... G01K 1/045 702/62
2006/0049694 A1 * 3/2006 Kates ........................ H02J 3/14 307/132 E
2006/0232333 A1 * 10/2006 Pirondini ................ H02H 3/12 330/253
2007/0038334 A1 * 2/2007 Chou ................... H01R 25/003 700/292
2009/0150509 A1 * 6/2009 Chang ................... G06F 1/3203 709/208
2009/0322159 A1 * 12/2009 DuBose .................. H02J 9/005 307/117
2011/0169342 A1 * 7/2011 Tinaphong ......... H01R 13/6683 307/126
2012/0049639 A1 * 3/2012 Besore ................... G01K 3/005 307/97

FOREIGN PATENT DOCUMENTS

TW M284100 12/2005
TW I329948 9/2010

* cited by examiner

*Primary Examiner* — Jared Fureman
*Assistant Examiner* — Emmanuel R Dominique
(74) *Attorney, Agent, or Firm* — Guice Patents PLLC

(57) ABSTRACT

The present invention relates to a socket having loading detecting function, which comprises: a housing; at least a socket; a sensor; a relay; a detection circuit capable of detecting the loading value of the socket; and a control unit. The control unit can be used for recording the maximum of the loading value, and said maximum is multiplied by an coefficient thereby obtaining a first threshold value; meanwhile comparing the loading value to the first threshold value and a second threshold value, when the loading value is lower than both of the first threshold value and the second threshold value, the control unit terminates the relay after a second time period for cutting off the electric source of the socket.

10 Claims, 6 Drawing Sheets

SOCKET HAVING LOADING DETECTING FUNCTION

BACKGROUND OF THE INVENTION

1. Field of the Invention

The present invention relates to a socket having loading detecting function, especially to a socket having loading detecting function capable of shutting off the electric source of an electric equipment being in a standby state and turning on the electric source while sensing a turning-on signal of the electric equipment for achieving an objective of saving energy.

2. Description of Related Art

A conventional electric equipment, e.g. a television, an audio system or an air conditioner, is often equipped with a remote controlling function, so a user can control the electric equipment by using a remote control. Generally, the electric equipment having remote controlling function is required to turn on the electric source for being in a standby state, so a control signal emitted by the remote control can be received at anytime. However, the electric equipment consumes the standby current while being in the standby state, the standby current is not high but still waste considerable amount of energy in long term because the electric source is turned on most of the time. Moreover, a conventional electric equipment is inserted with a socket for obtaining the electric source required for operation, the socket may be provided with function of surge absorbing or overcurrent protection, but not equipped with an energy-saving function.

SUMMARY OF THE INVENTION

One primary objective of the present invention is to provide a socket having loading detecting function, which has at least a socket, when a human is approaching a sensor, a relay is enabled to be conducted for supplying the electric source to the socket, and when the loading value is lower than both of a first threshold value and a second threshold value, a control unit terminates the relay after a second time period thereby cutting off the electric source of the socket and achieving the objective of saving energy.

Another objective of the present invention is to provide a socket having loading detecting function, which is capable of determining whether the current of a socket exceeding a threshold value to decide supplying or not supplying electric power to the socket of the socket having loading detecting function.

For achieving the objectives, the present invention provides a socket having loading detecting function, which comprises: a housing formed with at least a first orifice; at least a socket installed in the housing and each socket is respectively exposed outside the first orifice for allowing an electric equipment to be inserted; a sensor installed in the housing or exposed outside the housing, and capable of emitting a sensing signal when a human is approaching; a relay installed in the housing and coupled to the socket, one end thereof is coupled with an electric source, and capable of controlling whether supplying electric power to the socket; a detection circuit installed in the housing and coupled to the socket, capable of sensing the loading value of the socket; and a control unit installed in the housing and coupled to the sensor, the relay and the detection circuit, when receiving the sensing signal, a control signal is outputted to the relay, so the relay is conducted for supplying the electric source to the socket; and when the maximum of the loading value has been persisted for a first time period, the control unit records the maximum, and the maximum is multiplied by an coefficient thereby obtaining a first threshold value; meanwhile the control unit compares the loading value to the first threshold value and a second threshold value, when the loading value is lower than both of the first threshold value and the second threshold value, the control unit terminates the relay after a second time period for cutting off the electric source of the socket.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
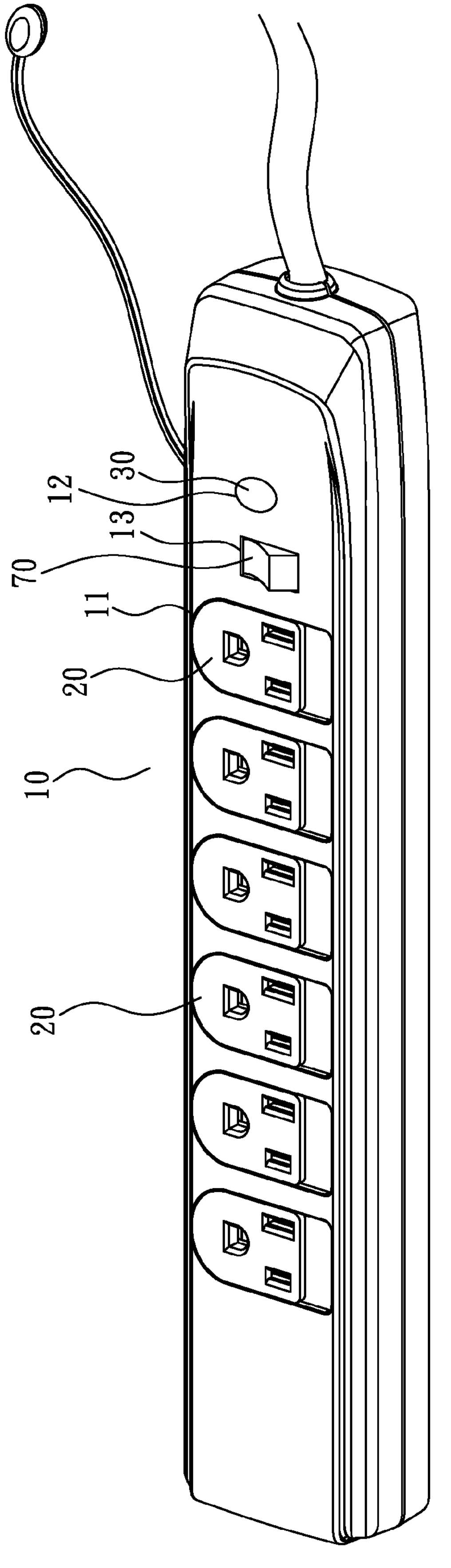
FIG. 1 is a schematic view illustrating the assembly of the socket having loading detecting function according to one preferred embodiment of the present invention.
Figure 2:
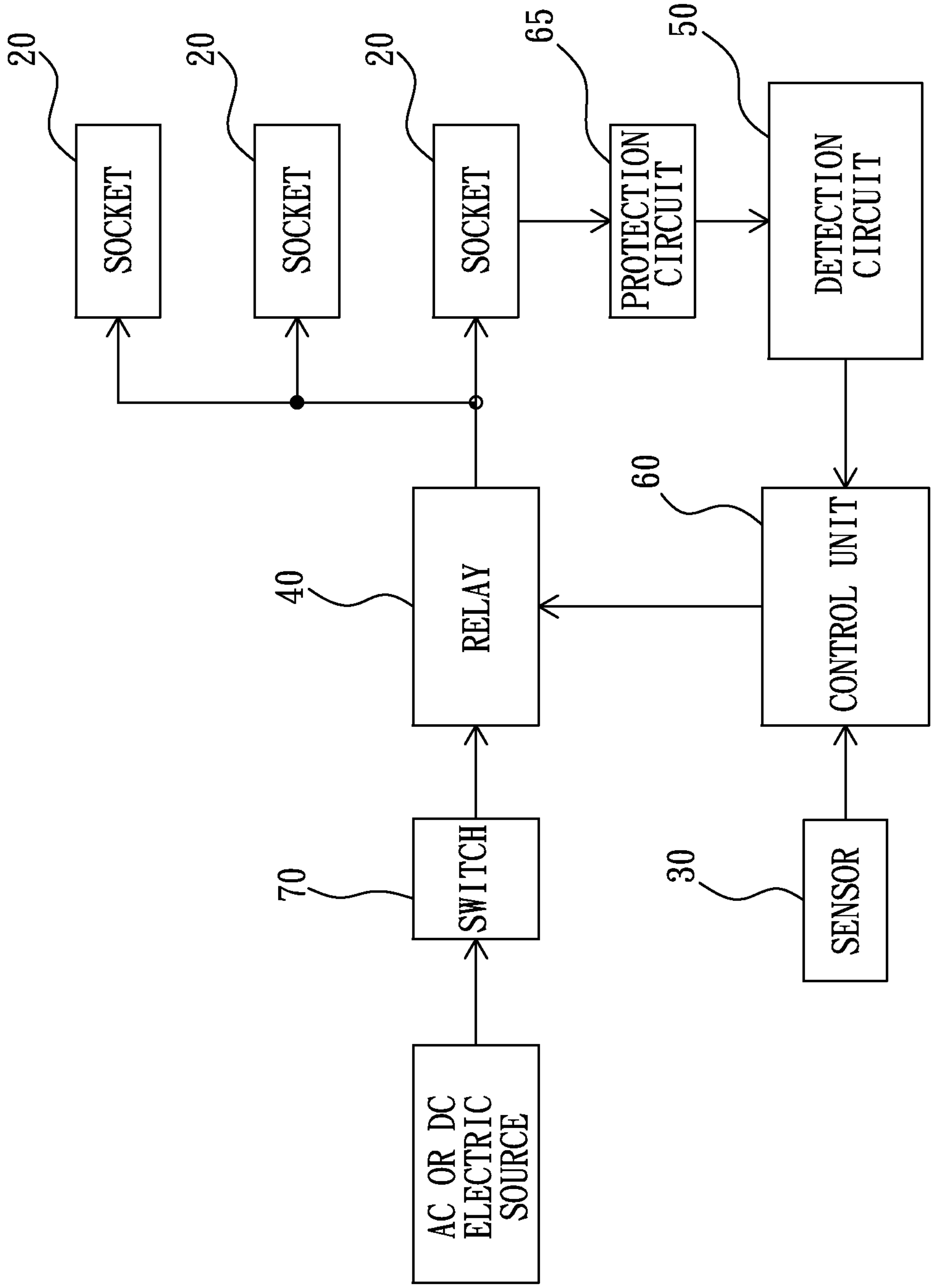
FIG. 2 is a block diagram illustrating the socket having loading detecting function according of the present invention.

Referring to FIG. 1 and FIG. 2, wherein FIG. 1 is a schematic view showing the assembly of the socket having loading detecting function according to one preferred embodiment of the present invention; and FIG. 2 is a block diagram illustrating the socket having loading detecting function according of the present invention. According to the present invention, the socket having loading detecting function at least includes: a housing 10; at least a socket 20; a sensor 30; a relay 40; a detection circuit 50; and a control unit 60.

The housing 10 is preferably made of an insulation material, e.g. but not limited to a plastic material, and formed with a first orifice 11 for accommodating the socket 20, the sensor 30, the relay 40, the detection circuit 50 and the control unit 60.

The at least one socket 20 can be a conventional AC 110V two-hole or three-hole socket or a 220V three-hole socket, and can be installed in the housing 10 and each socket 20 is respectively exposed outside the first orifice 11, thereby allowing an electric equipment (not shown in figures) to be inserted for obtaining the electric source required for operation. Wherein, the quantity of the socket 20 is the same as that of the first orifice 11. According to one preferred embodiment of the present invention, the socket having loading detecting function respectively has six sockets 20 and six first orifices 11.

The sensor 30 is installed in the housing 10 or exposed outside the housing 10, and is used for sensing whether a human is approaching the socket 20. Wherein, the sensor 30 can be an infrared (IR) sensor, a pyroelectric passive infrared (PIR) sensor or a radio frequency (RF) sensor, wherein the infrared (IR) sensor can be used for sensing any infrared turning-on or shutting-off signal emitted by a remote control (not shown in figures) of the electric equipment. The pyroelectric passive infrared (PIR) sensor can be used for sensing the human motion in front of the dynamic energy-saving socket. The radio frequency (RF) sensor can be used for sensing any turning-on or shutting-off signal having a certain frequency emitted by the remote control of the electric equipment. According to the present invention, the sensor 30 adopted in the socket having loading detecting function is an infrared (IR) sensor, a pyroelectric passive infrared (PIR) sensor or a radio frequency (RF) sensor or a combination of the above three. For example, the embodiment disclosed in FIG. 1 adopts an infrared (IR) sensor as the sensor 30. The embodiment disclosed in FIG. 3 adopts a pyroelectric passive infrared (PIR) sensor as the sensor 30. The embodiment disclosed in FIG. 4 adopts a radio frequency (RF) sensor as the sensor 30. In addition, the adopted quantity of the sensor 30 is determined according to the actual needs, i.e. the socket having loading detecting function of the present invention can be installed with more than one of the infrared (IR) sensor, the pyroelectric passive infrared (PIR) sensor or the radio frequency (RF) sensor or a combination of the above three.

The relay 40 is installed in the housing 10 and coupled to the socket 20, one end thereof is coupled to an electric source, e.g. but not limited to an AC or DC electric source, and the relay 40 is controlled by the control unit 60 for being conducted or terminated.

The detection circuit 50 is installed in the housing 10 and coupled to the socket 20 for sensing the loading value, e.g. but limited to the current value, applied to the socket 20, wherein the detection circuit 50 is, e.g. but not limited to, a current sensor capable of sensing the current of the socket 20 and feeding back to the control unit 60.

The control unit 60 is installed in the housing 10 and respectively coupled to the sensor 30, the relay 40 and the detection circuit 50. The control unit 60 can be a microcontroller and further installed with a memory and an analogy-to-digital port (not shown in figures). When the sensor senses a human is approaching the socket 20 or senses a turning-on signal emitted by a remote control (not show in figures), a sensing signal is outputted by the sensor to the analog-to-digital port of the control unit 60 for being converted into a digital data then transmitted to the control unit 60, then the control unit 60 outputs a control signal to the relay 40, such that the relay 40 is conducted for supplying the electric source to the socket 20; and when the detection circuit 50 detects the maximum of the loading value of the socket 20 has been persisted for a first time period, e.g. but not limited to twenty seconds, the control unit 60 records the maximum in the memory, and the maximum is multiplied by an coefficient, e.g. but not limited to 0.3, 0.4 or 0.6, thereby obtaining a first threshold value; meanwhile the control unit 60 compares the loading value to the first threshold value and a second threshold value, when the loading value is lower than both of the first threshold value and the second threshold value, the control unit 60 terminates the relay after a second time period for cutting off the electric source of the socket, thereby achieving the objective of saving energy, wherein, the second time period is e.g. but not limited to 180 seconds. Wherein, the second threshold value is e.g. but not limited to 0.4 A with the AC electric power source being 230V, and is e.g. but not limited to 0.8 A with the AC electric power source being 110V.

After the socket having loading detecting function provided by the present invention is assembled, when the sensor 30 does not yet sense a human is approaching the socket 20 or sense a turning-on signal emitted by the remote control, the relay 40 is still maintained in a terminated state and no electric source is supplied to the socket 20, as such, the generation and consumption of standby current of the electric equipment is prevented; when the sensor 30 senses a human is approaching the socket 20 or the turning-on signal emitted by the remote control, the control unit 60 outputs a control signal to the relay 40 thereby allowing the relay 40 to be conducted, and the electric source is enabled to be supplied to the socket 20 for allowing the electric equipment to be normally operated.

When the detection circuit 50 detects the maximum of the loading value in the socket 20 has persisted more than twenty seconds, the control unit 60 records the maximum, and the maximum is multiplied by the coefficient for obtaining the first threshold value, meanwhile the control unit 60 compares the loading value to the first threshold value and the second threshold value, when the loading value is lower than both of the first threshold value and the second threshold value, it indicates that the signal sensed by the sensor 30 is an false action, so the control unit 60 terminates the relay 40 after 180 seconds for cutting off the electric source of the socket 20, thereby achieving the objective of saving energy.

As such, with the structure, when the loading value of the socket 20 is lower than both of the first threshold value and the second threshold value, the electric source supplied to the socket 20 is terminated, thereby preventing generation and consumption of the standby current, and improving the disadvantages of a conventional energy-saving socket.

Figure 6:
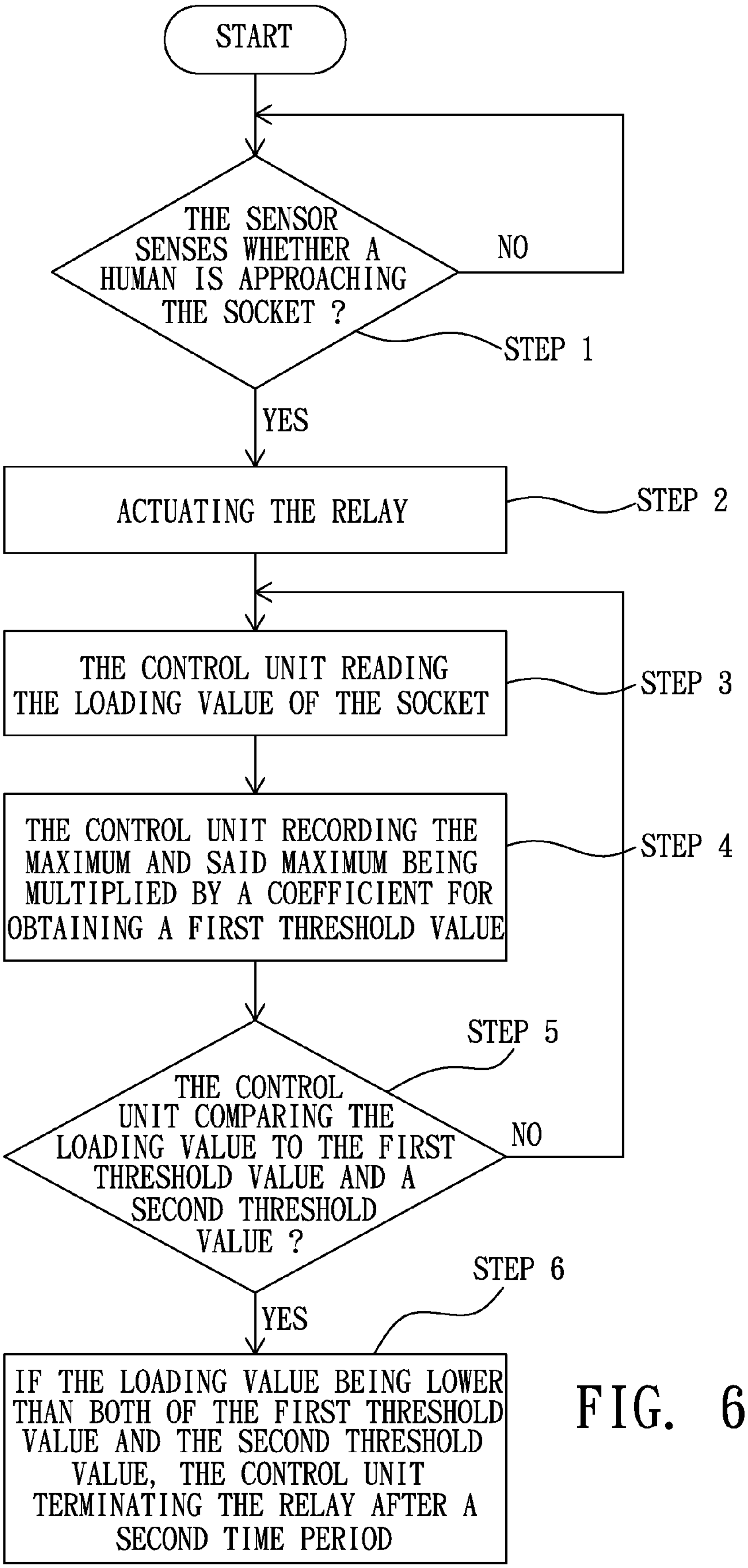
FIG. 6 is a flowchart illustrating the determination program of the memory according to the present invention.

In addition, the memory of the control unit 60 further includes a determination program which is capable of determining whether the loading value of the electric equipment inserted with the socket 20 exceeding the first threshold value and the second threshold value according to the total current fed by the detection circuit 50, the determination principle and process is shown in FIG. 6.

Moreover, the socket having loading detecting function of the present invention further includes a protection circuit 65 installed in the housing 10 and coupled between the detection circuit 50 and the socket 20, when the current of the socket 20 is overly high, a bypass function can be provided for protecting the socket having loading detecting function. Wherein, the protection circuit 65 is a surge protection circuit or an EMI filter.

In addition, the socket having loading detecting function of the present invention further includes a switch 70 and the housing 10 further includes a second orifice 12 and a third orifice 13, wherein the second orifice 12 is provided for exposing the sensor 30, the switch 70 is installed in the housing 10 and exposed outside the third orifice 13, and the switch 70 is coupled between the electric source and the relay 40 for turning on or shunting off the electric source.

Figure 3:
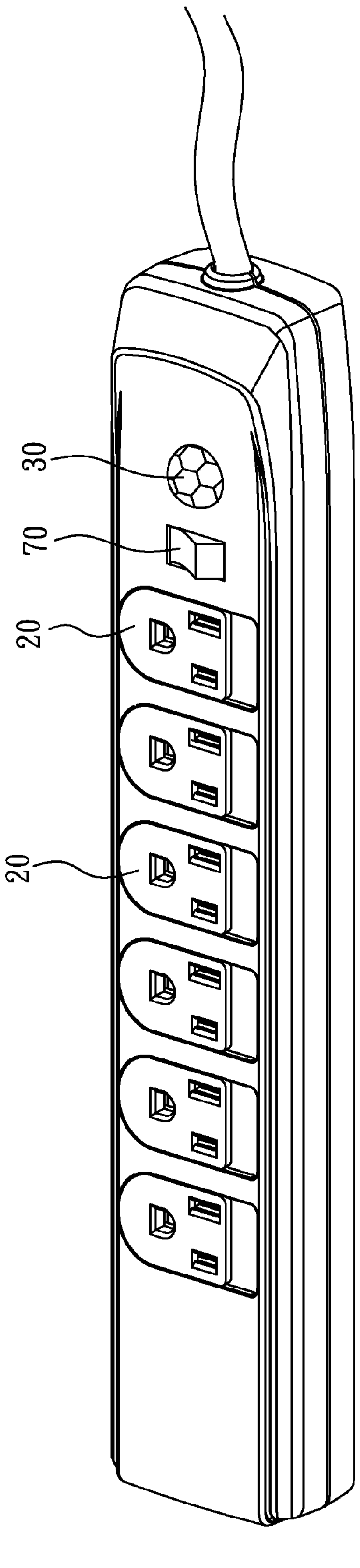
FIG. 3 is a schematic view illustrating the assembly of the socket having loading detecting function according to another preferred embodiment of the present invention.

Referring to FIG. 3, which is a schematic view showing the assembly of the socket having loading detecting function according to another preferred embodiment of the present invention. As shown in FIG. 3, the sensor 30 is a pyroelectric passive infrared (PIR) sensor which is capable of sensing the human motion in front of the socket 20, take the operation of controlling a television as an instance, when the user presses the turning-on button on a remote control for emitting a turning-on signal, the sensor 30 receives the turning-on signal emitted by the remote control, at this moment, the control unit 60 outputs a control signal for enabling the relay 40 to be conducted, thereby supplying the electric source to the socket 20 and enabling the television to be normally operated; if the sensor 30 senses a pyroelectric passive infrared signal within a certain period of time, e.g. 5 to 10 minutes, the sensed signal indicates that the user walks around instead of sitting or standing at a fixed location to watch television, so the control unit 60 determines that as a false action and re-terminates the electric source of the socket 20, thereby avoiding the false action of the sensor 30.

Figure 4:
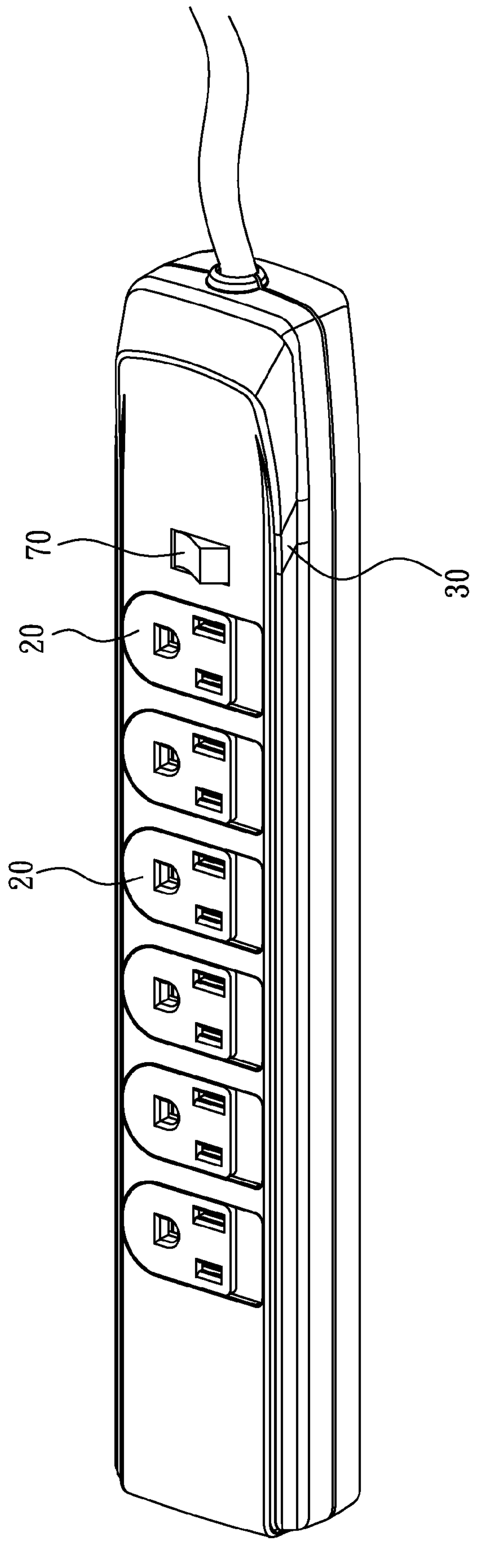
FIG. 4 is a schematic view illustrating the assembly of the socket having loading detecting function according to one another preferred embodiment of the present invention.

Referring to FIG. 4, which is a schematic view showing the assembly of the socket having loading detecting function according to one another preferred embodiment of the present invention. As shown in FIG. 4, the sensor 30 is a radio frequency (RF) sensor, when the radio frequency (RF) sensor 30 receives a turning-on signal emitted by a radio frequency (RF) remote control, the control unit 60 outputs a control signal to control the relay 40 thereby enabling the relay 40 to be in a conducted state, at this moment, the electric source can be supplied to the socket 20 for allowing the electric equipment to be normally operated. As such, with the socket having loading detecting function, the generation and consumption of standby current is prevented while the electric equipment being is a standby state, thereby effectively improving the disadvantages of the conventional socket.

Figure 5:
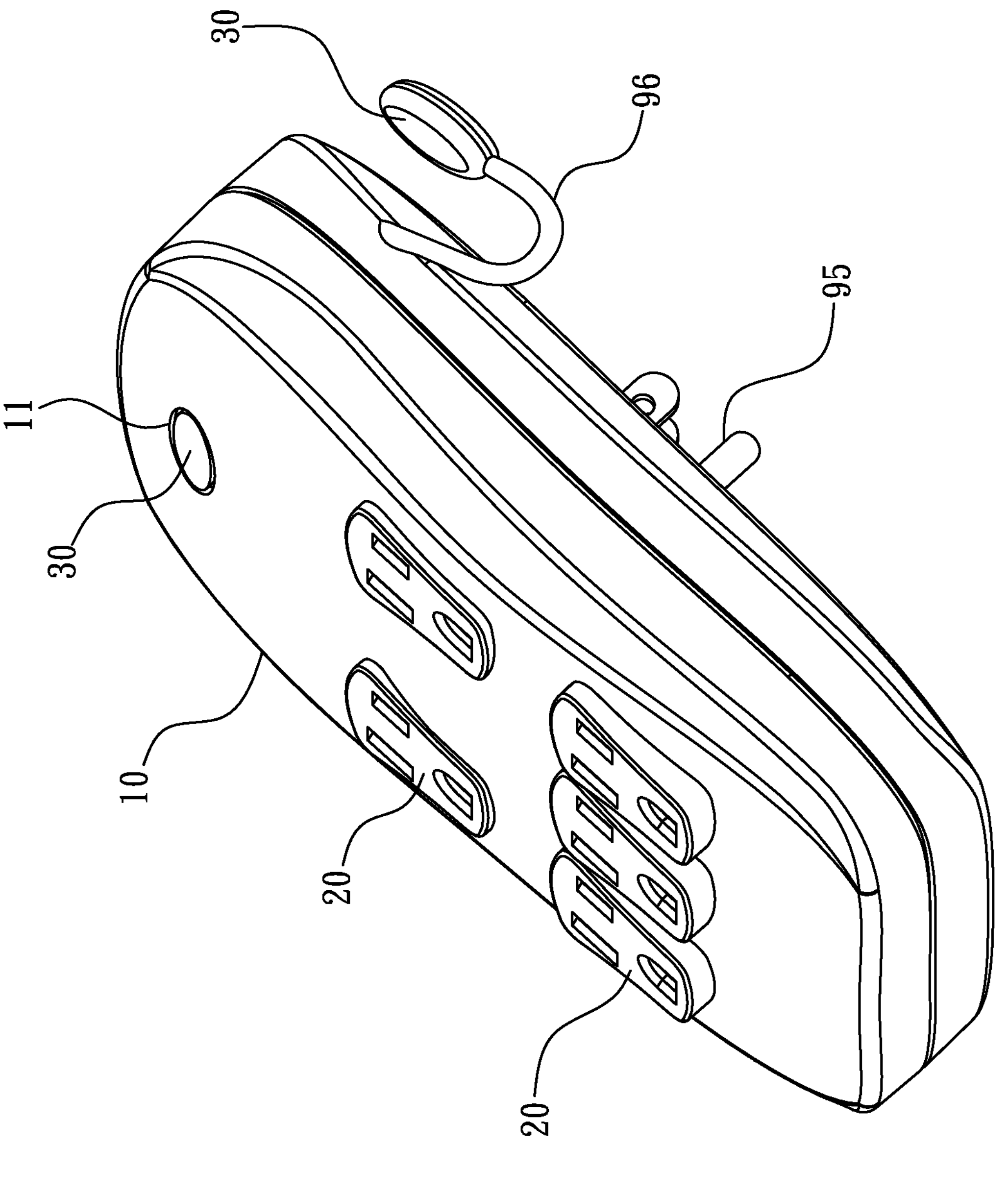
FIG. 5 is a schematic view illustrating the assembly of the socket having loading detecting function according to still one another preferred embodiment of the present invention.

Referring to FIG. 5, which is a schematic view showing the assembly of the socket having loading detecting function according to still one another preferred embodiment of the present invention. As shown in FIG. 5, the socket having loading detecting function of the present invention can have its plug 95 to be disposed at the bottom of the housing 10, thereby reducing the volume of the socket having loading detecting function. Moreover, the infrared (IR) sensor 30 of the socket having loading detecting function can not only be installed in the housing 10 or be exposed outside the first orifice 11, but also capable of increasing its sensibility by utilizing a conduction cable 96 for extending to a certain length. Moreover, the socket having loading detecting function of the present invention can be installed with more than one sensor 30.

Referring to FIG. 6, which is a flowchart illustrating the determination program of the memory according to the present invention. As shown in FIG. 6, the control unit 60 of the socket having loading detecting function has a determination program, which comprises the steps of: the sensor 30 senses whether a human is approaching the socket 20 (step 1); if YES, the relay 40 is actuated (step 2); the control unit 60 reads the loading value of the socket 20 (step 3); the control unit 60 records the maximum and the maximum is multiplied by a coefficient for obtaining a first threshold value (step 4); the control unit 60 compares the loading value to the first threshold value and a second threshold value (step 5); if the loading value is lower than both of the first threshold value and the second threshold value, the control unit 60 terminates the relay 40 after a second time period (step 6).

Wherein, in the step 1 and step 2, when the sensor 30 senses a human is approaching the socket 20, the sensor 30 outputs a sensing signal to the analog-to-digital port of the control unit 60, then the control unit 60 outputs the control signal to the relay 40, thereby conducting the relay 40 for allowing electric power to be supplied to the socket 20. If the sensor 30 does not sense any human is approaching the socket 20, then the sensing action continues.

In the step 3, the loading value is fed by the detection circuit 50 back to the analog-to-digital port of the control unit 60 for being converted to a digital data so as to be stored in the memory (not shown in figures).

In the step 4, the control unit 60 records the maximum and the maximum is multiplied by a coefficient for obtaining a first threshold value; wherein the coefficient is, e.g. but not limited to, 0.3, 0.4 or 0.6.

In the step 5, the control unit 60 compares the loading value to the first threshold value and a second threshold value, wherein the second threshold value is e.g. but not limited to 0.4 A with the AC electric power source being 230V, and is e.g. but not limited to 0.8 A with the AC electric power source being 120V.

In the step 6, when the loading value is lower than both of the first threshold value and the second threshold value, the control unit 60 terminates the relay 40 after a second time period, wherein, the second time period is e.g. but not limited to 180 seconds.

As what is disclosed above, the socket having loading detecting function provided by the present invention has at least a socket, when a human is approaching the sensor, the relay is enabled to be conducted for supplying the electric source to the socket, and when the maximum of the loading value has been persisted for a first time period, the control unit records the maximum and the maximum is multiplied by a coefficient for obtaining a first threshold value, meanwhile the control unit compares the loading value to the first threshold value and a second threshold value, when the loading value is lower than both of the first threshold value and the second threshold value, the control unit terminates the relay after a second time period thereby cutting off the electric source of the socket. As such, the socket having loading detecting function provided by the present invention is novel comparing to conventional sockets.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims.

Although specific terms are employed herein, they are used in a generic and descriptive sense only and not for purposes of limitation.

What is claimed is:

1. A socket having loading detecting function, comprising:

a housing formed with at least a first orifice;

at least one socket installed in said housing and each socket being respectively exposed outside said first orifice for allowing an electric equipment to be inserted;

a sensor installed in said housing or exposed outside said housing, and capable of emitting a sensing signal when a human being approaching;

a relay installed in said housing and coupled to said socket, one end thereof being coupled with an electric source, and capable of controlling whether supplying electric power to said socket;

a detection circuit installed in said housing and coupled to said socket, capable of sensing a loading value of said socket;

a control unit installed in said housing and coupled to said sensor, said relay and said detection circuit, when receiving said sensing signal, a control signal being outputted to said relay, said relay being conducted for supplying said electric source to said socket; and when a maximum loading value of said loading value having been persisted for a first time period, said control unit recording said maximum loading value, and said maximum loading value being multiplied by an coefficient thereby obtaining a first threshold value; meanwhile said control unit comparing said loading value to said first threshold value and a second threshold value, when said loading value of said socket being lower than both of said first threshold value and said second threshold value, said control unit starting a second time period and terminating said relay and cutting off said electric source of said socket after said second time period.

2. The socket as claimed in claim 1, wherein said housing is made of an insulation material, and said electric source is an AC electric source or a DC electric source.

3. The socket as claimed in claim 2, wherein said first time period is 20 seconds, said second time period is 180 seconds, said coefficient is 0.3, 0.4 or 0.6; said second threshold value is 0.4 A with the AC electric power source being 230V, and is 0.8 A with the AC electric power source being 120V.

4. The socket as claimed in claim 1, wherein the quantity of said socket is the same of the quantity of said first orifice.

5. The socket as claimed in claim 1, wherein said sensor is an infrared (IR) sensor, a pyroelectric passive infrared (PIR) sensor, a radio frequency (RF) sensor or a combination thereof, wherein said infrared (IR) sensor is used for sensing any infrared turning-on or shutting-off signal emitted by a remote control of said electric equipment; said pyroelectric passive infrared (PIR) sensor is used for sensing the human motion; and said radio frequency (RF) sensor is used for sensing any turning-on or shutting-off signal having a certain frequency emitted by said remote control of said electric equipment.

6. The socket as claimed in claim 1, wherein said control unit is a microcontroller and further installed with a memory and an analogy-to-digital port.

7. The socket as claimed in claim 6, wherein said detection circuit is a current sensor capable of sensing the current of said socket and feeding back to said analog-to-digital port for being converted to a digital data then transmitted to said control unit.

8. The socket as claimed in claim 7, wherein said memory further includes a determination program which is capable of determining whether said loading value of said electric equipment inserted with said socket exceeding said first threshold value and said second threshold value with respect to the current fed by said current sensor.

9. The socket as claimed in claim 1, further including a protection circuit installed in said housing, said protection circuit is coupled between said detection circuit and said at least one socket and said detection circuit is coupled between said protection circuit and said control unit, when the current of said socket is overly high, a bypass function is provided for protecting said socket, wherein said protection circuit is a surge protection circuit or an EMI filter.

10. The socket as claimed in claim 1, further including a switch and said housing further includes a second orifice and a third orifice, wherein said second orifice is provided for exposing said sensor, said switch is installed in said housing and exposed outside said third orifice, and said switch is coupled between said electric source and said relay for turning on or shunting off said electric source.

* * * * *